US007024501B1

(12) United States Patent
Wright

(10) Patent No.: US 7,024,501 B1
(45) Date of Patent: Apr. 4, 2006

(54) METHOD AND APPARATUS FOR ATTACHING USB PERIPHERALS TO HOST PORTS

(75) Inventor: David G. Wright, Escondido, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 193 days.

(21) Appl. No.: 10/299,429

(22) Filed: Nov. 18, 2002

(51) Int. Cl.
*G06F 13/12* (2006.01)

(52) U.S. Cl. ............................ 710/72; 710/14; 710/16; 710/18; 710/19; 710/36

(58) Field of Classification Search .................... 710/1, 710/5, 7, 17, 19, 35, 36, 62–64, 73, 129, 710/72; 712/225; 463/39, 40; 455/73
See application file for complete search history.

(56) References Cited

U.S. PATENT DOCUMENTS 5,605,505 A * 2/1997 Han ............................ 463/39
5,881,366 A * 3/1999 Bodenmann et al. ...... 455/41.2
6,524,189 B1 * 2/2003 Rautila ........................ 463/40
6,565,441 B1 * 5/2003 Hames et al. ................. 463/39
6,585,596 B1 * 7/2003 Leifer et al. .................. 463/39
6,684,062 B1 * 1/2004 Gosior et al. ................. 455/73
6,719,633 B1 * 4/2004 Leifer et al. .................. 463/39

OTHER PUBLICATIONS

USB Specification, Revision 2.0, Apr., 27, 2000, p. 120.*

* cited by examiner

*Primary Examiner*—Kim Huynh
*Assistant Examiner*—Alan Chen
(74) *Attorney, Agent, or Firm*—Marger Johnson & McCollom, PC

(57) ABSTRACT

A wireless peripheral controller connects multiple wireless game controllers to a game console across a communication port. A connector simulates the appearance of connecting a device to another communication port. Upon detecting the connection event, the game console queries the communication port associated with the connection event. A bus reset detector alerts the wireless peripheral controller. The alerted wireless peripheral controller signals the game console through the original communication port with the appropriate configuration instructions to obtain a unique device address for an additional wireless game controller. Using the unique device addresses, the wireless peripheral controller receives and responds to traffic intended for other communication ports through the original communication port.

18 Claims, 4 Drawing Sheets

METHOD AND APPARATUS FOR ATTACHING USB PERIPHERALS TO HOST PORTS

TECHNICAL FIELD

The present invention relates to peripheral device controllers. More particularly, the present invention relates to connecting wireless devices to a console using a single data channel.

BACKGROUND AND RELATED ART

The Universal Serial Bus (USB) has become the dominant interface used for connecting Human Interface Devices (HIDs) such as mice, keyboards and game controllers to Personal Computers (PCs). This dominance is starting to extend to non-PC computing platforms, such as game consoles.

Wireless HIDs are not currently natively supported by any computing platform, and they therefore require a base station or dongle to be attached to the PC or game console to act as a local interface between a wired USB connection provided by the platform and the wireless remote device. Typically, such dongles present an interface to the USB host on the platform such that the software running on the platform is unaware that the HID is wireless. The dongle creates a virtual wired HID for interfacing to the platform.

For reasons both of convenience and economy, it is desirable to have a single dongle to link multiple wireless HIDs to the USB host. This is the current practice with wireless HIDs connected to PCs. This is achieved by having the dongle virtualize multiple HIDs over a single USB connection, typically by means of multiple alternate interfaces.

However, in multi-player games, consoles typically associate the port to which a HID is connected with a given game player. Thus in a 2-player game, the HID connected to port 1 will control the game play of player 1 and the HID connected to port 2 controls the game play of player 2. It is therefore conventionally not possible to use a single dongle connected to a single USB port to connect to multiple wireless HIDs.

SUMMARY

A wireless peripheral controller connects multiple wireless devices to a console using one of the console communication ports. In response to connection events detected on different console communication ports, the wireless peripheral controller may allow additional wireless devices to conduct communication with the console across the initial console communication port. The wireless peripheral controller may be configured to respond to a bus-reset signal sent to a different console communication port using the original communication port.

Additional features and advantages of the wireless peripheral controller will be set forth in the description that follows, and in part will be obvious from the description, or may be learned by the practice of the wireless peripheral controller. The features and advantages of the wireless peripheral controller may be realized and obtained by means of the instruments and combinations particularly pointed out in the appended claims. These and other features of the wireless peripheral controller will become more fully apparent from the following description and appended claims, or may be learned by the practice of the wireless peripheral controller as set forth hereinafter.

BRIEF DESCRIPTION OF THE DRAWINGS

The embodiments of the invention are illustrated by way of example, and not by way of limitation, in the figures of the accompanying drawings in which like reference numerals refer to similar elements. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Figure 1:
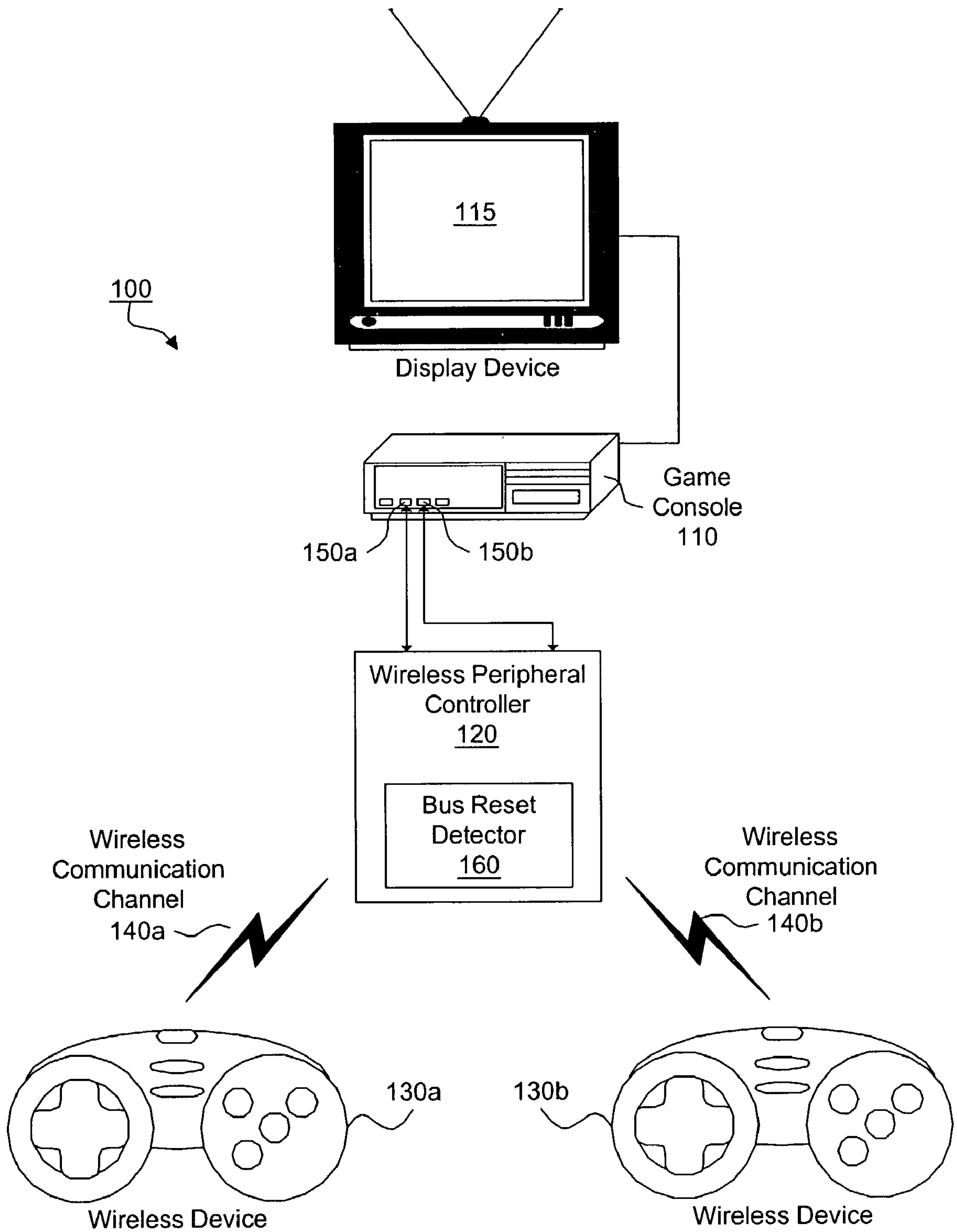
FIG. 1 illustrates an operating environment for a wireless peripheral controller.

FIG. 1 and the following discussion are intended to provide a brief, general description of a suitable wireless operating environment 100 that includes a host or game console 110 and a display device 115, such as monitor and/or television. The game console 110 includes at least one communication port 150 electrically coupled with a wireless peripheral controller 120. Exemplary game consoles 110 include the Microsoft® Xbox®, Sony® Playstation®, Nintendo® Gamecube™, Set-Top Boxes (STBs) or other specialized game entertainment centers.

The wireless peripheral controller 120 receives control signals from multiple wireless devices 130 through at least one wireless communication channel 140. Upon receiving the control signals, the wireless peripheral controller 120 transmits commands from the wireless devices 130 to the game console 110 over a single communication port 150*a*. In one embodiment, communication port 150A is a a Universal Serial Bus (USB) port. A bus reset detector 160 detects control signals from the game console 110 directed to a communication port 150*b*. The peripheral controller 120 uses communication port 150*a* to respond to the control signals initially detected on port 150*b*.

The wireless peripheral controller 120 is in wireless communication with wireless devices 130*a* and 130*b* through wireless communication channels 140*a* & 140*b* respectively. The wireless peripheral controller 120 may act as a receiver or transceiver for the multiple wireless devices 130, depending on the functionality of the attached wireless device 130. Any wireless device 130 can be used with controller 120 including game controllers, mice, keyboards, digital pads, joysticks, display devices, local wireless network hubs, scanners, printers, personal digital assistant (PDA) systems and other remote input/output wireless devices.

Figure 2:
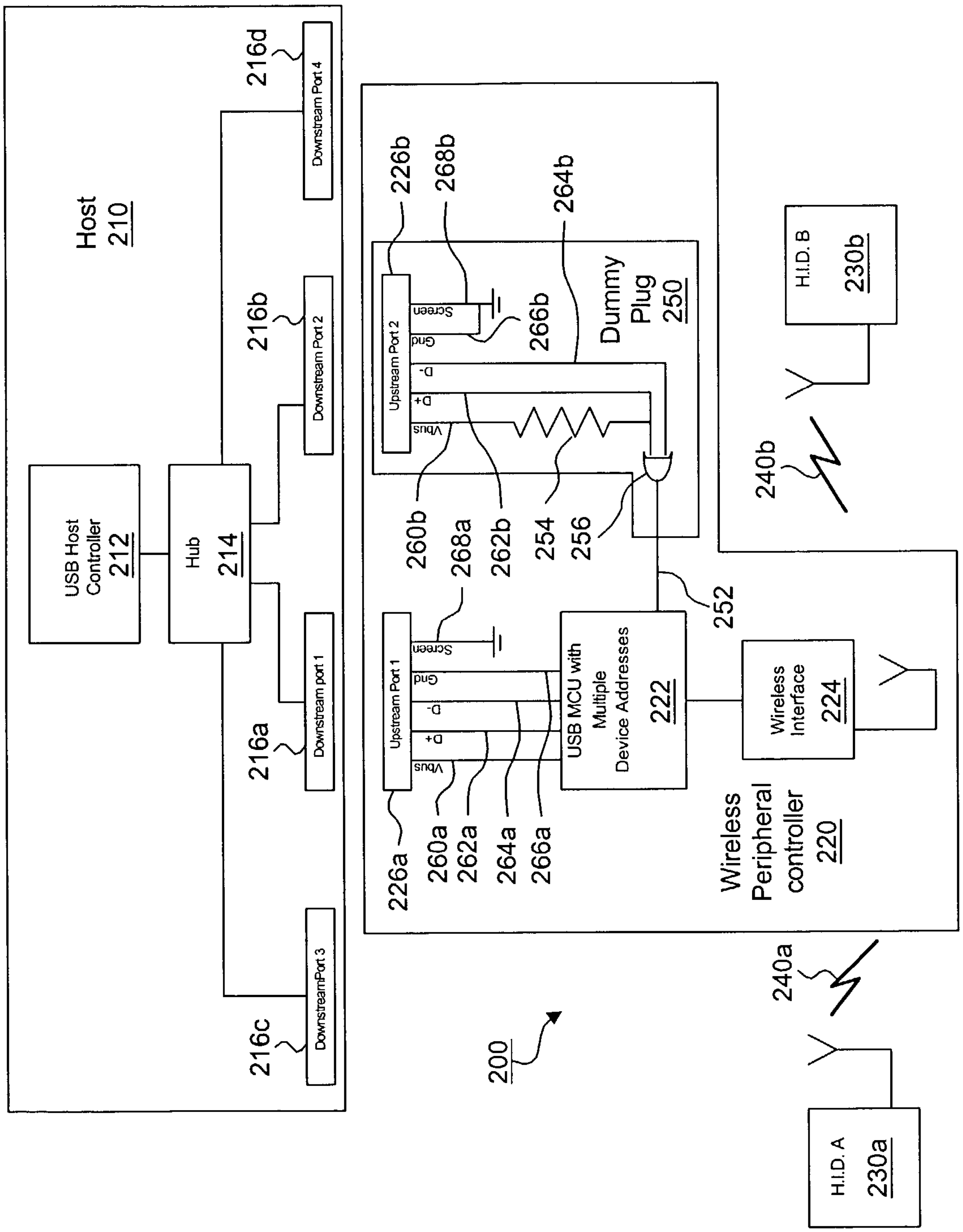
FIG. 2 illustrates the wireless peripheral controller in more detail.

FIG. 2 shows a USB system 200. The system 200 includes a host 210, a wireless peripheral controller 220, and multiple wireless HIDs 230. The wireless peripheral controller 220 communicates with HID 230*a* and HID 230*b* using wireless communication channels 240*a* and 240*b*.

In one embodiment, the host 210 includes a USB host controller 212 coupled to a USB hub 214 (a root hub or a subsidiary hub) having multiple downstream communication ports 216*a*–216*d*. The wireless peripheral controller 220 includes a USB micro-controller unit (MCU) 222, a wireless communication interface 224, and multiple upstream ports 226.

The host 210 detects a connection event when an upstream port 226 of the peripheral controller 220 is physically coupled to one of the downstream ports 216. The connection event in one embodiment indicates that pulls up a D+USB signal line or disconnects a device has been connected or disconnected from one of the downstream ports 216. In one embodiment, the device is connected when a resistor pulls up a D+ USB signal line.

When a connection event is detected on a downstream port 216 (D+ pullup), the host controller 212 sends a bus reset signal to the downstream port 216 where the connection is detected. The USB host controller 212 then uses a default device address to communicate with the recently detected device.generates a device address "0" in response to the device that responds to device address "0". The USB host controller 212 assumes that the device that device responding to the default device address "0" is attached to the port on which the connection event was detected.

The hub 214 broadcasts USB communication signals from the USB host controller 212 to all the downstream ports 216. Thus, all of the USB traffic from the host controller 212 is visible to the peripherals connected to the hub 214, regardless of whether or not the traffic is addressed to that peripheral. The peripheral responds or ignores such transmissions from the host controller 212 according to the device address associated with the transmissions.

Upon detecting a new connection, the USB host controller 212 assigns a unique device address to the newly connected USB device. In one embodiment, this assignment is accomplished by sending a "reset" signal to the downstream ports 216*a*–216*d* on which the connection event was detected of the hub 214. The host 210 then communicates with the newly attached device using the USB default device address "0" and begins the process of "enumerating" the newly connected device. During enumeration, the host 210 determines the operational characteristics of the newly attached device and assigns the device a unique device address. The device address assigned by the host 210 is then used for all subsequent communications between the host 210 and the peripheral device.

The wireless HIDs 230 may report their operational characteristics in different ways. For example, the wireless HID 230 may report its operational characteristics to the host 210. Alternatively, the peripheral controller 220 may reports its own operational characteristics to the host 210 and uses the MCU 222 and wireless interface 224 to configure communications with the HIDs 230.

In the first example configuration, the wireless peripheral controller 220 simply relays signals between the HID 230 and USB host controller 212. In the second example configuration, the wireless peripheral controller 220 operates as the newly activated peripheral device. The HIDs 230 are then treated as resources, features, alternate interfaces or extensions for the wireless peripheral controller 220.

Regardless of which set of operating characteristics are used to obtain the device address, the host controller 212 assigns a device address to each perceived connection. The wireless peripheral controller 220 is thus responsive to data sent to multiple different USB device addresses generated by the host controller 212 through a single upstream port 226*a*.

The wireless interface 224 includes a first wireless communication channel 240*a* that receives wireless control signals from a first wireless HID 230*a*. A second wireless communication channel 240*b* receives wireless control signals from a second wireless HID 230*b*. In one embodiment, the wireless HIDs 230 are game controllers.

Other exemplary wireless HIDs include wireless sound activated controllers, light activated controllers, pressure activated controllers, movement activated controllers, and other wireless Input/Output (I/O) devices, such as mice, keyboards, game controllers, scanners, printers, facsimile devices.

In one embodiment, the wireless peripheral controller 220 also includes a non-operable USB port or dummy USB plug 250 that simulates an operating communication port. An exemplary non-operable USB port includes a pull-up resistor 254 coupled between a D+pin 262*b* and a Vbus pin 260*b*. Once the connection between the downstream port 216*b* and the upstream port 226*b* is made, the "D+" signaling line 262*b* is pulled up by a 1.5 k resistor 254. Signal lines 266*b* and 268*b* in the upstream port 226*b* of the dummy plug 250 are tied to ground.

The dummy plug 250 has a bus reset detection signal line 252 in electrical communication with the MCU 222. The bus reset detection signal line 252 notifies the MCU 222 when the upstream port 226*b* receives a bus reset signal from the host 210. The bus reset detection signal line 252 allows the MCU 222 to respond through port 1 to the subsequent messages directed from the host controller 212 to port 2. This includes any messages associated with the default address used for port 2 and the enumeration process directed to port 2.

The USB host controller 212 may send a bus reset signal to all of each the downstream ports 216 that detects a connection event by simultaneously driving low both the D+ lines 262 and the D− lines 264. The dummy plug 250 includes a bus-reset detector 256 that identifies the bus reset state. In one embodiment, the bus-reset detector is implemented using either OR gate or a logical NOR gate connected to both the D+ line 262*b* and the D− lines 264*b*. Once the bus reset signal line 252 is enabled, the MCU 222 waits for the bus reset condition to end and then responds to communications directed to the default device address. The MCU 222 of the wireless peripheral controller 220 can enumerate a second device with the USB host controller 212 using the first connected upstream communication port 226*a*.

Another embodiment feeds all of the signal lines 260–268 into control logic located within the peripheral controller 220. This allows the MCU 222 to manipulate the control logic to produce the appropriate connection and response signals in all of the attached plugs. In this configuration, the first set of signal lines 260*a*–268*a* would conduct communications for all of the attached plugs and the remaining signal lines 260*b*–268*b* would be configured as non-operable ports or dummy plugs 250.

FIG. 2 only illustrates one embodiment of the USB wireless peripheral controller system 200. Several other configurations can also be implemented. For example, an embodiment using more than two wireless devices would also benefit from a host design architecture that only uses a single communication channel for multiple wireless devices. Yet, another possible configuration uses a wireless peripheral controller 220 that is integrated into the host 210. The wireless peripheral controller 220 is also not limited to USB ports. Any bus architecture employing multiple wireless devices would benefit from this invention.

Figure 3:
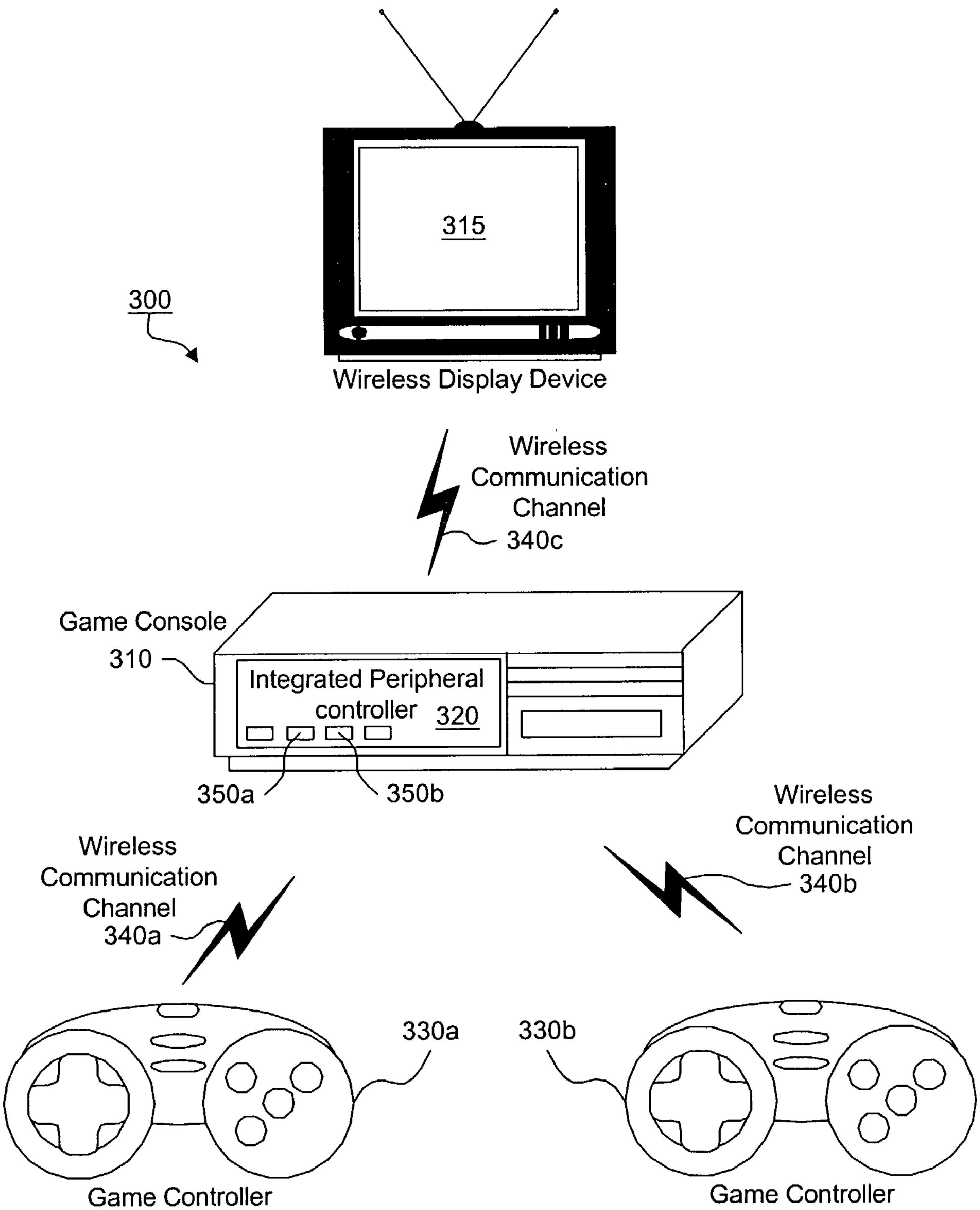
FIG. 3 illustrates an integrated wireless peripheral controller.

FIG. 3 illustrates an integrated wireless peripheral controller system 300. The system 300 includes a wireless game console 310, a wireless display device 315, and multiple wireless game controllers 330. The game console 310 includes an integrated wireless peripheral controller 320. In one embodiment, the peripheral controller 320 is in wireless communication with the game controllers 330*a* and 330*b* through wireless communication channels 340*a* and 340*b*. The display device 315 may also be in wireless communication with the game console 310 across wireless communication channel 340*c*.

One embodiment allows the game console 310 to simultaneously use wireless game controllers 330 and game controllers physically coupled to game communication ports 350 on the game console 310. The peripheral controller 320 detects and then requests a device address from the game console 310. The peripheral controller 320 receives wireless control signals from the wireless game controllers 330. The peripheral controller 320 separates wireless control signals transmitted by the game controllers 330 according to assigned device addresses and forwards the control signals to the game console 310.

In one embodiment, the peripheral controller 320 activates a connection event on an unused game communication port 350*a*. Upon receiving a bus reset from the game console 310, the peripheral controller 320 responds to any endpoint "0" traffic directed to the previously unused port 350 using a first device address.

Recognizing that the game console 310 is attempting to communicate with the previously unused port 350*a*, the peripheral controller 320 changes a first device address associated with a first wireless game controller 330*a* to the assigned value provided by the game console 310 during the enumeration process. In the event that a second wireless game controller 330*b* is activated, the peripheral controller 320 may generate a connection event on a second unused game communication port 350*b*. As with the first unused communications port 350*a*, an endpoint "0" request is transmitted immediately after a bus reset is detected to the second unused port 350*b*. The peripheral controller 320 recognizes that the game console 310 is attempting to communicate with the second previously unused port 350*b* and associates a second device address with the second wireless game controller 330*b*.

In one embodiment, the peripheral controller 320 may have its own virtual communication port electrically connected to a root hub in the game console. The virtual communication port may create connection events that appear to originate from any of the unused game communication ports 350. Once enumeration has taken place for the device addresses, communication is similar to a configuration where multiple wireless HIDs are communicating with a host through a single connection using multiple endpoints or interfaces using a single device address, except that both device addresses will be used through the single virtual connection.

The wireless communication channels 330*a*, 330*b*, and 330*c* may be separate or shared channels. Typically, the game controllers 330 require a substantially lower bandwidth than the display device 315. The bandwidth of the attached device may determine the type of communication channel.

Selection of the appropriate wireless communication channel involves selecting performance trade-offs among reliability, system speed, noise or interference, controller battery life, processing speed, power consumption, line of sight, and other system preferences. Exemplary low cost wireless communication channels include electrical, optical, acoustical or other form of propagated signals (e.g., carrier waves, infrared signals, radio signals, digital signals). Other wireless communication protocols potentially useful with various embodiments include UWB (Ultra-Wideband), ZigBee, Bluetooth, 802.11 RF, HiperLan, Home RF, SWAP, OpenAir, and other short-range wireless protocols. Bluetooth is the codename for a technology specification for small form factor, low-cost, short-range radio links between wireless devices. While Bluetooth offers speedy transmission of up to one megabyte per second, as a combination of specialized computer chips and software its use would increase the game controller component cost substantially. The IEEE 802.11 RF wireless standards: 802.11 HR, 802.11b, and 802.11 @ 5 GHz standards are also wireless networking environments that can be used for implementing the invention.

Figure 4:
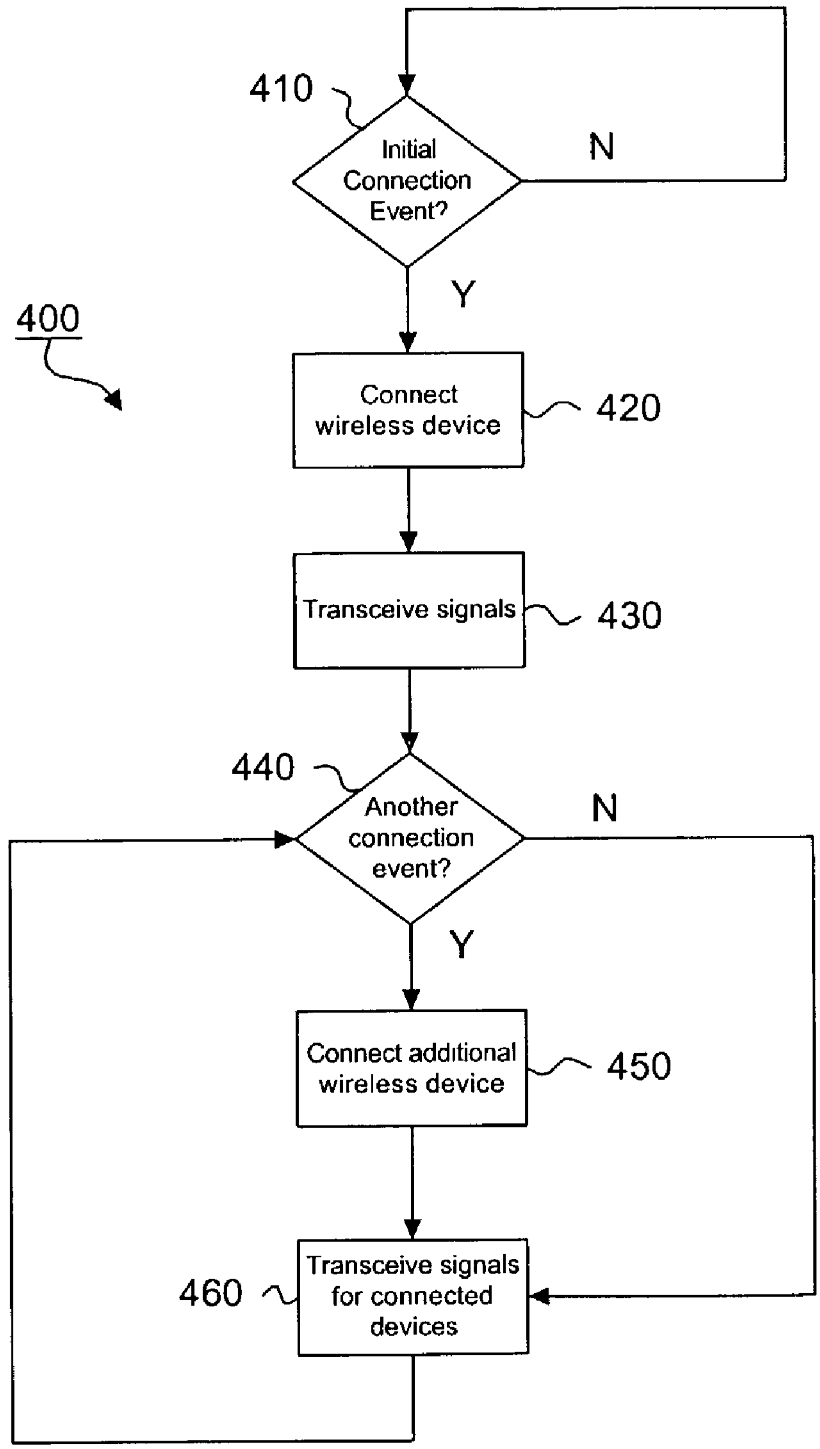
FIG. 4 is a flow chart showing how the wireless peripheral controller operates.

FIG. 4 a particular method described in terms of computer software and hardware with reference to a flowchart. The methods to be performed by an electronic device constitute digital logic or computer programs made up of computer-executable instructions. Describing the methods by reference to a flowchart enables one skilled in the art to develop such programs including such instructions to carry out the methods on suitably configured electronic devices (the processor or micro-controller of the computer or game console executing the instructions from computer-accessible media).

The computer-executable instructions may be written in a computer programming language or may be embodied in firmware logic. If written in a programming language conforming to a recognized standard, such instructions can be executed on a variety of hardware platforms and for interfaces to a variety of operating systems.

It will be appreciated that a variety of programming languages may be used to implement the wireless controller system as described herein. Furthermore, it is common in the art to speak of software, in one form or another (e.g., program, procedure, process, application . . . ), as taking an action or causing a result. Such expressions are merely a shorthand way of saying that execution of the software by an electronic device causes the processor of the computer or game console to perform an action or a produce a result.

FIG. 4 is a flowchart that illustrates one embodiment of a wireless peripheral system 400. Upon detecting an initial connection event 410, the system 400 connects a first wireless device in block 420. In a USB compatible embodiment, connecting the wireless device includes obtaining a unique device address, endpoint, or interface to associate with the wireless device for future communications. The type of connection established may also be based on the operational parameters of the wireless device. For example, a display device may need more bandwidth than a wireless mouse or keyboard.

Once the communication channels with the wireless device and the host are established, the system 400 receives signals from the wireless device and transmits received signals to the host in block 430. One embodiment also allows the system 400 to receive signals from the host and transmit them to the wireless device. An example might be a feedback signal for a steering wheel game controller that causes the wheel to shake, thereby simulating a real steering wheel.

Periodically the system 400 checks for additional connection events in block 440. This process helps the system to determine if any additional wireless devices have recently been connected. Upon detection of another connection event in block 440, the system 400 connects the additional wireless device in block 450. While the connection process in block 450 is similar to the process used to make the first connection in block 420, the original communication channels between the system 400 and the host may be used. Thus, the system 400 need only maintain a single communication channel with the host, regardless of how many devices are connected to the system 400. Once the additional wireless device is connected to the host, the system 400 returns to receiving signals from the connected wireless devices and transmitting the received signals to the host in block 460. Upon detecting an additional connection event, the system returns to block 440.

The present invention may be embodied in other specific forms without departing from its spirit or essential characteristics. The described embodiments are to be considered in all respects only as illustrative and not restrictive. Therefore, the scope of the invention is indicated by the appended claims rather than by the foregoing description. All changes that come within the meaning and range of equivalency of the claims are to be embraced within their scope.

The invention claimed is:

1. An apparatus comprising:

a wireless communication interface having a first wireless communication channel configured to receive wireless control signals from a first wireless Human Interface Device (HID) and a second wireless communication channel configured to receive wireless control signals from a second wireless HID;

a control interface having a communication port configured to transmit the wireless control signals received from both the first wireless HID and the second wireless HID; and wherein the communication port is a Universal Serial Bus (USB) port and is configurable to transmit control signals received from a plurality of HIDs;

wherein the control interface includes a bus reset detector that enables the second wireless communication channel with at least one of the second wireless HIDs to receive and respond to traffic directed to a different communication port.

2. The apparatus of claim 1 wherein the first wireless HID and the second wireless HID are game controllers.

3. The apparatus of claim 1 wherein the control interface is configured to distribute peripheral control signals received over the communication port to the first and second wireless communication channels.

4. The apparatus of claim 3 including a peripheral controller that assigns and links unique device addresses to each wireless HID electronically attached to the wireless communication interface.

5. The apparatus in claim 1 wherein the control interface includes at least one non-operable USB port that simulates a connection event of an operating communication port.

6. The apparatus of claim 5 wherein the non-operable USB port includes a pull-up resistor coupled between a D+ and a Vbus pin.

7. The apparatus of claim 1, wherein the wireless communication device is an intermediary USB device facilitating the transfer of the wireless control signals to a host.

8. A system comprising:

a host having at least a communication port;

a wireless peripheral controller coupled to the communication port;

a plurality of wireless devices conducting wireless communications over the communication port through the wireless peripheral controller; and wherein the communication port comprises a Universal Serial Bus (USB) port and the plurality of wireless devices communicate over the USB port;

wherein the wireless peripheral controller comprises a dummy port that simulates a connection of a fully operating communication port;

wherein the wireless peripheral controller includes a bus reset detector which detects a reset caused by the dummy port.

9. The system in claim 8 wherein the wireless peripheral controller transmits control signals from the plurality of wireless devices through the same USB port.

10. The system in claim 9 wherein the wireless peripheral controller responds to a plurality of USB device addresses through the same USB port.

11. The system in claim 8 wherein the plurality of wireless devices are game controllers.

12. The system in claim 8 wherein the plurality of wireless devices include any one of the following: mice, keyboards, game controllers, scanners, printers, facsimile devices, sound activated controllers, light activated controllers, pressure activated controllers, and movement activated controllers.

13. A system comprising:

a host having at least a communication port;

a wireless peripheral controller coupled to the communication port;

a plurality of wireless devices conducting wireless communications over the communication port through the wireless peripheral controller; and a dummy port on the wireless peripheral controller that simulates a connection of an operating communication port;

wherein the wireless peripheral controller includes a bus reset detector for detecting a reset caused by the dummy port.

14. A method comprising:

connecting to a first wireless device;

connecting to a second wireless device;

transferring signals from the first wireless device and the second wireless device to a host through a common communication port;

initiating a first connection event on a first communication port;

receiving a first device address over the first communication port directed to the first wireless device in response to the first connection event;

conducting communications associated with the first device address over the first communication port;

generating a second connection event on a second communication port;

receiving a second device address over the first communication port directed to the second wireless device in response to the second connection event; and conducting communications associated with the second device address over the first communications port.

15. A method comprising:

generating a first connection event on a fist communication port corresponding to a first wireless device;

generating a second connection event on a second communication port;

receiving a second device address over the first communication port directed to a second wireless device in response to the second connection event; and conducting communications associated with the second device address over the first communications port;

wherein the first and second communication ports are configurable to couple a game console and a wireless communication interface;

wherein the second connection event causes a reset.

16. The method of claim 15 wherein either the first communication port or the second communication port is a Universal Serial Bus port.

17. The method of claim 15 wherein the first or second wireless devices include any one of the following: mice, keyboards, game controllers, scanners, printers, facsimile devices, sound activated controllers, light activated controllers, pressure activated controllers, and movement activated controllers.

18. A method comprising:

connecting to a first wireless device;

connecting to a second wireless device; and transferring signals from the first wireless device and the second wireless device to a host through a common communication port which comprises a Universal Serial Bus port;

initiating a first connection event on a first communication port;

receiving a first device address over the first communication port directed to the first wireless device in response to the first connection event;

conducting communications associated with the first device address over the first communication port;

generating a second connection event on a second communication port;

receiving a second device address over the first communication port directed to the second wireless device in response to the second connection event; and conducting communications associated with the second device address over the first communications port.

* * * * *